United States Patent [19]

Holman

[11] 4,057,209

[45] Nov. 8, 1977

[54] LATERAL ADJUSTMENT MECHANISM FOR A MACHINE ANCHOR

[75] Inventor: Scott L. Holman, Farmington Hills, Mich.

[73] Assignee: Bay City Foundry Company, Franklin, Mich.

[21] Appl. No.: 747,829

[22] Filed: Dec. 6, 1976

[51] Int. Cl.² ............................................. A47G 19/00
[52] U.S. Cl. ........................................ 248/13; 248/23; 248/124; 248/183; 269/75
[58] Field of Search ................. 248/13, 12, 23, 122, 248/124, 178, 183, 185, 354 S, 279, 285, 298; 269/71, 75, 76

[56] References Cited

U.S. PATENT DOCUMENTS

| | | | |
|---|---|---|---|
| 1,418,655 | 6/1922 | Klemmer | 248/23 |
| 2,057,990 | 10/1936 | Whitaker | 248/23 |
| 2,340,572 | 2/1944 | Smith | 248/279 |
| 2,408,247 | 9/1946 | Wekeman | 248/122 |
| 2,444,541 | 7/1948 | Strickland | 248/12 |
| 2,444,727 | 7/1948 | Bush | 248/183 |
| 2,885,165 | 5/1959 | Smolen | 248/13 |
| 3,232,573 | 1/1966 | Berman | 248/124 |
| 3,934,829 | 1/1976 | Coucher | 248/23 |

FOREIGN PATENT DOCUMENTS 632,261  10/1927  France .................... 248/178

Primary Examiner—Marion Parsons, Jr.
Attorney, Agent, or Firm—Krass & Young

[57] ABSTRACT

A mechanism is disclosed for providing a lateral adjustment capability for anchors used to support engines or transmissions in dynamometer test stands or the like. The mechanism is comprised of an arrangement including a housing and a cylindrical slide member, adapted to be reciprocated in a laterally extending socket formed in the housing. The position of the slide is adapted to be adjusted in the socket by virtue of a threaded engagement with a capscrew carried by the housing at one end of the socket, and is locked in any adjusted position by a pair of threaded bolts, passing through the slide and socket walls and which are advanced into one of the socket walls to squeeze together the corresponding surfaces of the socket and slide member. The housing may be fastened to an anchoring device or directly mounted to a base plate or other supporting surface. The adjustment mechanisms are also disclosed as having the capability to be stacked to provide lateral adjustment in any lateral direction and are also disclosed as being utilized in opposing pairs in which case the slide member of one of the opposed pair is allowed to float to accommodate adjustments made in the other of the opposed pair to provide such lateral adjustment.

11 Claims, 8 Drawing Figures

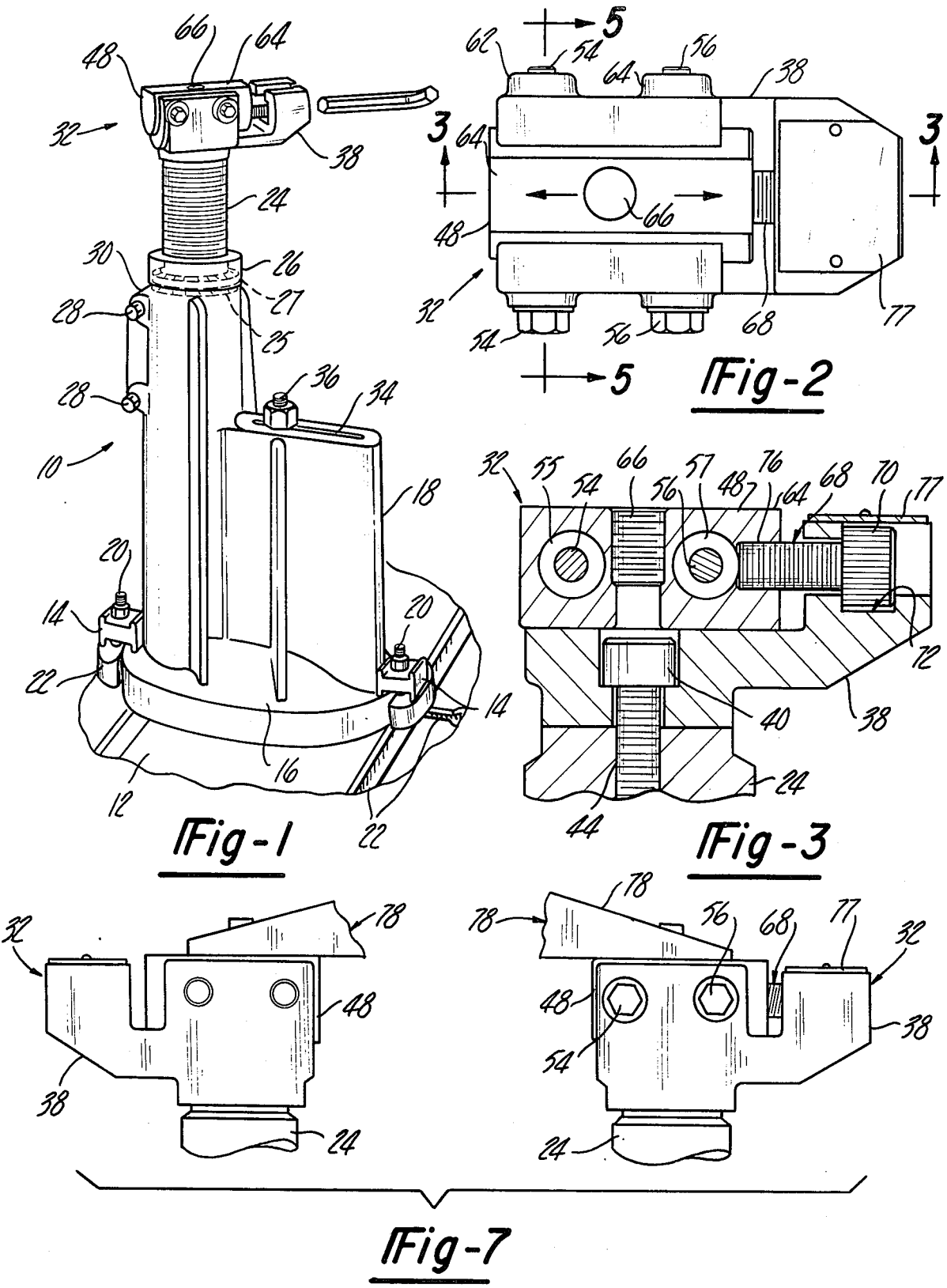

LATERAL ADJUSTMENT MECHANISM FOR A MACHINE ANCHOR

BACKGROUND OF THE INVENTION

1. Field of the Invention

This invention concerns anchoring devices, more particularly anchoring devices adapted to support machines, engines and transmissions for dynamometer testing, etc., and other applications in which precision alignment of the equipment mounted is required.

2. Description of the Prior Art

Mounting of equipment such as machine tools, engines and transmissions and dynamometer test stands require precision positioning of the equipment on the base plate or other supporting surfaces. Usually the anchoring devices provided for such purpose are laterally adjustable with respect to the base plate such that the alignment of equipment is carried out by means of such adjustment i.e., as by a T-bolt and slot arrangement.

Another approach described in U.S. Pat. No. 2,940,297 provides the lateral adjustment by means of a slotted mounting hole, formed in an anchor ball, allowing for transverse adjustment to allow internal alignment with the equipment to be mounted. In some cases the machine equipment is provided with pins which were mounted for sliding movement within openings adapted to have openings formed in the mounting blocks which are adapted to receive the pins and allow for lateral adjustment of the equipment. All these approaches involve a rather time consuming and painstaking movement of the engine or other equipment into position with a subsequent securing of the mounting means which is very time consuming and difficult, due to the mass of equipment involved. Furthermore, upon tightening of the locking means in the adjusted position there is a tendency for the equipment to shift slightly, disturbing the alignment achieved in setting up the equipment.

In addition it is often desirable or necessary to carry out adjustments in more than one direction at a given support point which capability is not provided by the aforementioned conventional anchoring devices.

It is, therefore, an object of the present invention to provide a lateral adjustment mechanism for use in conjunction with anchoring of engine transmission dynamometer set ups and similar situations in which the mechanism itself provides a means for adjusting the lateral position of the equipment mounted.

It is further object of the present invention to provide a locking arrangement for such lateral adjustment mechanism which does not disturb the position of the equipment mounted in any lateral direction.

It is another object of the present invention to provide such a lateral adjustment mechanism which is adapted to provide a capability for adjustment in more than one lateral direction at a single support point. It is yet a further object of the present invention to provide such a mechanism which provides very secure support for the equipment mounted so as to maintain its aligned position, even though large external forces and vibrations are imposed thereon.

SUMMARY OF THE INVENTION

These and other objects which will become apparent upon a reading of the following specifications and claims is accomplished by a lateral adjustment mechanism, comprised of a slide adapted to be adjusted in position by means of a drive means, included within the adjustment mechanism, engaging the slide and reciprocating it within a socket, with the equipment to be mounted secure to the slide member. The slide member is locked in an adjusted position by virtue of the invention of a pair of locking bolts, passing through the slide and adapted to draw together the sidewalls of the socket into firm locking engagement with the slide member. The slide member and the socket are formed with corresponding cylindrical surfaces such that the slide member is not shifted in position during the securement by the locking means. The adjustment mechanism is also adapted to be stacked with one or more other similar lateral adjustment mechanisms so as to provide an adjustment capability in more than one lateral direction. The lateral adjustment mechanism may also be used in pairs to provide lateral adjustment of such equipment as engines and transmissions and dynamometer test stands by omitting the driving mechanism from one of a pair of opposed lateral adjustment mechanisms while shifting the equipment by adjustment of the one drive mechanism associated with the lateral adjustment mechanism which does include a drive mechanism.

BRIEF DESCRIPTION OF THE DRAWINGS

FIG. 1 is a perspective view of an anchoring device, incorporating a lateral adjustment mechanism according to the present invention;

FIG. 2 is a plan view of a lateral adjustment mechanism incorporated in the anchoring device depicted in FIG. 1;

FIG. 3 is a view of Section 3 — 3 taken in FIG. 2.

FIG. 7 is a side elevational view of a pair of lateral adjustment mechanisms, adapted to provide a lateral adjustment of equipment mounted thereto.

DETAILED DESCRIPTION

Figure 4:
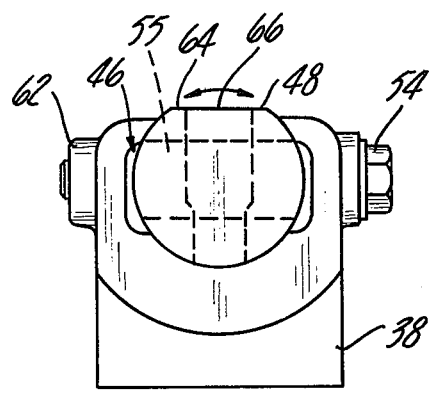
FIG. 4 is a front elevational view of the lateral adjustment mechanism shown in FIGS. 1 through 3.
Figure 5:
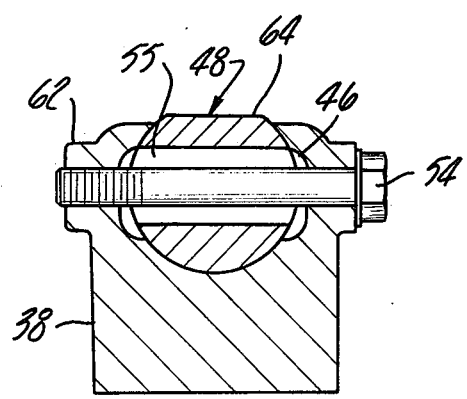
FIG. 5 is a view of the Section 5 — 5 taken in FIG. 2.
Figure 6:
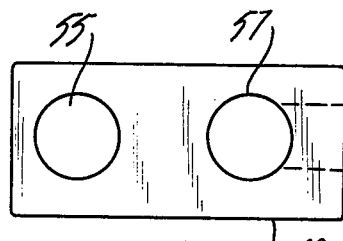
FIG. 6 is a plan view of the slide element incorporated in the adjustment mechanism shown in FIG. 1 — 5.

In the following detailed description certain specific terminology will be utilized for the sake of clarity and a particular embodiment, described in accordance with the requirements of 35 USC 112, but it is to be understood that the same is not intended to be limiting and the invention is capable of taking many forms and variations within the scope of the intended claims.

Referring to the drawings, particularly FIG. 1, an anchoring device 10 is shown, adapted to be secured to the surface of a base plate 12 by means of a plurality of hold-downs 14, engaging a flange 16, formed on an anchor housing 18 and having T-bolts, received within the hold-downs, including T-bolt 20, received within a series of crossing grooves 22, formed in the surface of the base plate 12. The anchoring device 10 also includes a screw shaft 24, received within the anchor housing 18 and adapted to be adjusted in elevation by means of a threaded ring 26 and secured in a given adjustment position by a pair of bolts 28, drawing together opposite halves of a split portion 30 of the housing 18 so as to securely engage the lower end of the threaded screw shaft 24. A pair of thrust bearings 25 and 27 are included in a recess in the lower part of the threaded ring 26 and a recess in the upper portion of the anchor housing 18 to allow adjustment of the threaded ring 26 under load. The anchoring mechanism 10 is adapted for lateral adjustment by virtue of a slotted mounting hole 34 with a T-bolt 36, passing there through and into engagement with a groove 22, formed in the base 12.

Secured to the upper end of the threaded screw shaft 24 is the lateral adjustment mechanism 32. This mechanism is depicted in detail in FIGS. 2 through 6. As will be described hereinafter in more detail, the lateral adjustment mechanism 32 allows for one lateral adjustment, the screw shaft 24 providing for vertical adjustment and the slot 34 - bolt 36 arrangement providing for a second lateral adjustment such that X, Y and Z position adjustment of equipment mounted to the lateral adjustment mechanism 32, can be carried out.

The lateral adjustment mechanism 32 includes a body member 38, adapted to be fastened to the threaded screw shaft 24 by means of a capscrew 40, passing through a portion of the body member 38 and threadably engaging a threaded bore 44, formed in the top of the screw shaft 24. The body member 38 is formed with a socket opening 46 of a partially cylindrical configuration, being open at the top so as to form a slot to allow the upper portion of a slide member 48 to extend, the slide member 48 slidably disposed in the socket opening 46. The slide member 48 is formed with partially cylindrical surfaces, socket 46 being formed with corresponding cylindrical surfaces, with relieved areas 50 and 52 formed intermediate the top and bottom edges. A pair of lock bolts 54 and 56 are provided, adapted to pass oversized openings 55 and 57, formed in the slide 48 and received into threaded holes 58 and 60, formed in bosses 62 and 64 so that upon advancing of the lock bolts 54 and 56, the sidewalls of the socket 46 are drawn together to securely engage the cylindrical surfaces of the slide 48. The nature of this engagement minimizes any movement of the slide by virtue of its reaction against the socket sidewall so as to eliminate any tendency for the equipment supported to be shifted upon locking engagement therewith.

The oversized openings 55 and 57 accommodate the rolling movement indicated in FIG. 4 of the slide 48 to allow for mounting of the slide 48 to slightly tilted mounting surfaces.

The upper surface of the slide 48 is formed with the flat surface 64 into which is formed a tapped hole 66 which provides access for installation of the capscrew 40 and also provides the mounting means for securing the equipment to be mounted to the slide 48.

The slide 48 is adapted to be reciprocated within the socket 46 for the limited movement allowed by the oversized holes 55 and 57 by virtue of a driving engagement with drive means comprised of a capscrew 68 carried by the body member 38 with the head 70 of the capscrew being retained in a recess 72 and a threaded body 74 engaging a threaded hole 76, formed in the end surface of the slide 48, disposed adjacent thereto. A cover 77 is provided to prevent the entrance of dirt etc., into the recess 72. The capscrew 68 and the threaded hole 76 engagement also accommodates the roll of the slide 48 in the socket 46.

In use the engine or transmission would be mounted an approximate location to a plurality of the anchoring devices 10 by bolting the engine mounts or adapters, therefore, to the threaded hole 66 on the slide 48. The locking bolts 54 and 56 being loosened, the capscrew 68 is rotated to cause the slide 48 to be adjusted in its lateral position so as to allow positioning of the equipment along the direction defined by the longitudinal axis of the slide 48. Upon properly aligning the equipment, the lock bolts 54 and 56 would then be tightened to secure equipment in the adjusted position.

In the context of engine transmission dynamometer testing lateral adjustment of the equipment would normally take place with oppositely disposed pair of lateral adjustment mechanisms 32 as shown in FIG. 7. In this instance the equipment 78 would be adjusted by virtue of operation of one of the lateral adjustment mechanisms with the capscrew 68 being omitted in the oppositely disposed one of such pair of lateral adjustment mechanisms 32 with both sets of locking bolts 56 and 54 being tightened to securely position the equipment 78 in the adjusted position.

Figure 8:
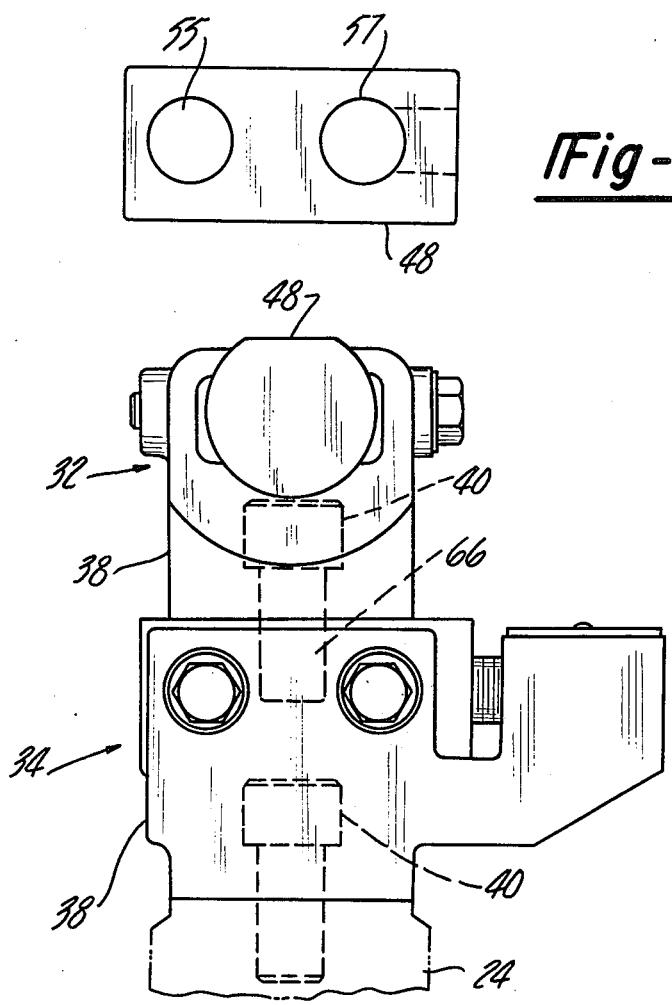
FIG. 8 is an elevational view of a pair of lateral adjustment mechanisms, stacked to provide an adjustment capability in two different directions at a single support point.

In some instances it may be advantageous to provide lateral adjustments in more than one direction at a given support point. In this instance the lateral adjustment mechanisms 32 described may be stacked as shown in FIG. 8 with the capscrew 40 which is normally disposed to engage the upper surface of the threaded screw shaft 24, extending into the mounting hole 66, formed in the slide member 48 of a lower second lateral adjustment mechanism 34 as shown in FIG. 8.

The orientation of the mechanism would be in transverse directions to each other and it should be understood that the relative orientation of the longitudinal axes of the respective slide members 48 could be at any desired angle. Thus, at the support point of the upper slide 48 the slide 48 of the upper lateral adjustment mechanism 32 can be adjusted in directions at 90° to each other.

It can be seen that this arrangement provides a very rapid and precisely controllable adjustment, since the adjustment means constitutes a driving mechanism to position the equipment with respect to the support anchors 10 in lateral directions. In addition it can be seen that the locking means provides very rigid securement in any given adjustment position of the equipment 78 without any great tendency for shifting of the relative adjusted position upon engagement therewith.

It should also be appreciated that the lateral adjustment mechanisms could be directly mounted to a base plate or other supporting structure if elevational adjustments were not required or provided by some other means.

The embodiments of the invention in which an exclusive property or privilege is claimed are defined as follows:

1. An anchoring arrangement having a lateral adjustment capability for supporting a structure with respect to a base surface comprising:
   an anchor housing adapted to be secured to said base surface;
   a vertically extending shaft received within said anchor housing;
   means for adjusting the elevational position of said vertically extending shaft;
   lateral adjustment means carried by the upper end of said vertically extending shaft; said adjustment means including an at least partially cylindrical slide member, such slide member having mounted means for securing said supported structure thereto;

means supporting said slide member for lateral movement along an axis parallel to the surface of said base structure, said means including a body member having a socket formed therein and adapted to slidably receive said slide member for movement therein, said body member being formed with a slot extending into said socket along the length thereof to form opposed socket walls, said slide member disposed in said socket with said mounting means accessible through said slot;

drive means included in said lateral adjustment means and adapted to reciprocate said slide member in said socket to thereby produce said lateral adjustment;

locking means for locking said slide member in any given adjusted position along said line of lateral movement, said locking means including means for drawing said socket walls formed by said slot into engagement with said slide member.

2. The anchor arrangement according to claim 1, wherein said drive means allows rolling movement of said slide member in said socket.

3. The anchor arrangement according to claim 2 wherein said drive means includes a threaded member carried by said lateral adjustment mechanism, the threaded member having a head portion and a threaded shank portion;

a recess formed in said body member and receiving said head portion;

an opening formed in said body member adjacent said recess through which said shank portion extends;

a threaded bore formed in said slide member and threadably engaging said shank, whereby rotation of said threaded member causes reciprocation of said slide member in said socket.

4. The anchor arrangement according to claim 1 wherein said locking means includes at least one locking member extending through said socket side walls and said side member.

5. The anchor arrangement according to claim 1 wherein said slide member has a flat portion extending on a surface thereof protruding through said slot formed in said body member wherein said mounting means comprises at least one threaded bore formed in said flat portion.

6. The anchor arrangement according to claim 1 wherein said body member is mounted to said vertically extending shaft by means of a fastener member passing through a wall formed in said body member and further includes a fastener member extending through said bore and engaging a bore formed in said vertically extending shaft.

7. An anchor arrangement for mounting a structure to base surface comprising:

a body member;

means for securing said body member to said base surface;

an at least partially cylindrical slide member having means for mounting said structure thereto;

means for slidably mounting said slide member with respect to said body member for lateral movement with respect to said base surface, said means including a socket formed in said body member and adapted to slidably receive said slide member and engaging the cylindrical surface on said slide member, said body member further being formed with a slot extending into said socket to form opposed socket side walls;

drive means included in said lateral adjustment means and adapted to reciprocate said slide member in said socket to thereby produce said lateral adjustment;

means for locking said slide member in said socket in any given adjusted position therein, said means including means for drawing said opposed socket side walls into locking engagement with said slide member, whereby said structure may be laterally adjusted with respect to said base surface and securely locked in a given position.

8. The drive arrangement according to claim 7 wherein said drive means allows rolling movement of said slide member in said socket.

9. The anchor arrangement according to claim 8 wherein said drive means includes a threaded member carried by said body member, the threaded member having a head portion and a shank portion;

a recess formed in said body member and receiving said head portion;

an opening formed in said body member adjacent to said recess through which said shank portion extends;

a threaded bore formed in said body member threadably engaging said shank portion.

10. The anchor arrangement according to claim 7 wherein said slide member is formed with a flat portion protruding through said slot formed in said body member.

11. The anchor arrangement according to claim 7 wherein said locking means includes at least one locking member extending through said opposed socket side walls in said slide member.

* * * * *